United States Patent [19]
Griesinger

[11] Patent Number: 6,040,916
[45] Date of Patent: Mar. 21, 2000

[54] PROCESS AND APPARATUS FOR DETERMINING THE CONDITION OF A ROAD SURFACE

[75] Inventor: Manfred Griesinger, Leonberg, Germany

[73] Assignee: DaimlerChrysler AG, Germany

[21] Appl. No.: 09/136,928

[22] Filed: Aug. 20, 1998

[30] Foreign Application Priority Data

Aug. 20, 1997 [DE] Germany .............................. 197 36 138
Feb. 26, 1998 [EP] European Pat. Off. ............... 98103365

[51] Int. Cl.[7] ........................... G01N 21/25; G01N 21/00; G01B 11/00; G08G 1/09
[52] U.S. Cl. ...................... 356/448; 356/237.2; 356/388; 356/390; 340/905
[58] Field of Search ............................... 356/240, 51, 371, 356/374, 237, 5.05, 237.2, 388, 448, 445, 390, 300, 303; 250/574; 340/905

[56] References Cited

U.S. PATENT DOCUMENTS

| | | | |
|---|---|---|---|
| 4,690,553 | 9/1987 | Fukamizu et al. | 356/51 |
| 5,163,319 | 11/1992 | Spies et al. | 356/371 |
| 5,459,313 | 10/1995 | Schrader et al. | 356/240 |
| 5,489,982 | 2/1996 | Gramling et al. | 356/5.05 |
| 5,801,647 | 9/1998 | Survo et al. | 250/574 |
| 5,808,734 | 9/1998 | Kolari | 356/237 |

FOREIGN PATENT DOCUMENTS

| | | |
|---|---|---|
| 30 23 444 | 1/1981 | Germany . |
| 35 45 366 A1 | 7/1986 | Germany . |
| 40 40 842 A1 | 2/1992 | Germany . |
| 41 41 446 C1 | 2/1993 | Germany . |
| 41 33 359 A1 | 4/1993 | Germany . |
| 38 41 333 C2 | 1/1997 | Germany . |
| WO 96/26430 | 8/1996 | WIPO . |
| WO 97/27077 | 7/1997 | WIPO . |

Primary Examiner—Frank G. Font
Assistant Examiner—Roy M. Punnoose
Attorney, Agent, or Firm—Evenson, McKeown, Edwards & Lenahan, P.L.L.C.

[57] ABSTRACT

In a process for determining the condition of a road surface, light is beamed onto the road surface and backscattered light is detected and spectrally analyzed. The light beam contains two light fractions, one having wavelength range which is not significantly absorbed by water/ice and another having a wavelength range which is significantly absorbed by these materials. The first light fraction contains light of several different wavelengths and the spectral analysis includes the determination of an approximation reference curve for the spectral plots of the backscattered light when the road is dry. This is accomplished by using the spectral data of the backscattered light fraction in the wavelength range without significant absorption, and the determination of the difference between the spectral data of the backscattered-light fraction in the other wavelength range and the corresponding data of the approximation reference curve for at least one wavelength. A typical use, for example, is for continuous qualitative and quantitative determination of the condition of the road surface on which a road vehicle is driving.

20 Claims, 2 Drawing Sheets

PROCESS AND APPARATUS FOR DETERMINING THE CONDITION OF A ROAD SURFACE

BACKGROUND AND SUMMARY OF THE INVENTION

This application claims the priority of German patent documents 197 36 138.2, filed Aug. 20, 1997 and 98103365.7, filed Feb. 26, 1998, the disclosures of which are expressly incorporated by reference herein.

The invention relates to a process for determining the condition of a road surface in which light is beamed onto the road surface, and the backscattered light is detected and spectrally analyzed. The light beam contains two light fractions from wavelength ranges with and without significant adsorption by water/ice.

The process according to the invention is used to detect, qualitatively and preferably also quantitatively, the presence of water or ice on the road surface, and can be implemented by a system mounted in a vehicle. For this purpose, generally the backscatter behavior of at least one light wavelength which is not significantly absorbed by water, ice or snow is compared to the backscatter behavior of a wavelength that is absorbed by water, ice or snow. The term "without significant absorption" means that, although there may be a certain low absorption, it is definitely lower than in the case of a wavelength range that exhibits a significant amount of water absorption.

German published patent application DE 41 33 359 A1 describes a similar technique to detect the thickness of a water layer on a road in a zero-contact manner. That is, the light which is beamed onto the road surface contains at least two wavelengths from the short infrared range which are subjected to a water absorption of different intensities. For example, for a sensitive measuring range, a measuring wavelength at 1,450 nm and a comparative wavelength at 1,190 nm with a comparatively lower absorption are selected. On the other hand, for example, for an insensitive measuring range, a measuring wavelength at 1,190 nm and a comparative wavelength at 1,080 nm with an even lower absorption are selected. The thickness of a water layer present on the road surface is then determined, assuming an exponential law of absorption and a "gray" road surface (i.e., one which absorbs all wavelengths at the same fraction).

The assumption of a gray radiator for the road surface is critical. In fact, measurements on various road coverings have demonstrated that. it is valid only to a limited extent. For example, some road coverings exhibit a noticeable rise of their spectral reflection capacity in the presence of increasing wavelengths.

International patent document WO 96/26430 A1 discloses a process in which the spectral backscattering capacity of the respective road surface is taken into account. In a linear approximation, the basic or background influence is determined by performing reference measurements at a wavelength below and a wavelength above the measuring range with a significant absorption by water/ice. An interpolating straight background line (reference approximation curve) is placed through these two reference points. In addition, two backscatter measurements are performed in the interval between the reference points at different wavelengths which carry the water/ice information. Via the subtraction using a straight background line, two corresponding background-cleared measuring values are derived. From the sum, difference and quotient of the measured values, a conclusion is drawn concerning the total existing amount of moisture, the fraction of the already frozen material and the thickness of the water or ice layer.

The process described in WO 96/26430 A1 has the disadvantage that, because of a total of only four supporting points, high precision is unobtainable. On the one hand, it is desirable that the background can be more precisely detected than is possible by means of a linear approximation. On the other hand, the process described in WO 96/26430 A1 does not disclose a starting point from which analysis of a larger number of measuring values is achieved in a suitable manner.

German patent document DE 41 41 446 C1 discloses a process for measuring the thickness of a layer of water, snow or ice on a road surface which is based on run-time measurements.

German published patent application DE 30 23 444 A1 discloses a device for determining the condition of the road, in which infrared radiation having a wavelength at which the reflection capacity of snow is lower than that of the dry road surface, is beamed onto the road surface. The backscattered light is then compared with reference signal levels which correspond to previously classified conditions of the road surface.

German patent document DE 38 41 333 C2 describes a process for monitoring the condition of a road. Here, electromagnetic radiation is beamed onto a tread surface of a vehicle wheel running on the road, and backscattered radiation is analyzed.

German published patent application DE 35 45 366 A1 discloses a measuring device for the visual determination of the thickness of a film of water situated, for example, on a metallic surface, in which light is beamed onto the film of water. The light contains a measuring beam of a wavelength absorbed by the film of water, and a reference beam of a wavelength which is subjected to zero water absorption. The thickness of the film of water is then determined from the ratio of the measuring signal level (representing the backscattered measuring beam ratio) to the reference signal level (representing the backscattered reference beam ratio), multiplied with a temperature correction coefficient. Here, the measuring signal level and the reference signal level are optionally averaged over several measuring operations.

German published patent application DE 40 40 842 A1 describes an infrared microwave sensor system for recognizing the road condition (specifically, for recognizing whether the road is dry, wet or icy). This system contains networks consisting of one or several comparators, or one or several gates or flip-flops for processing the signals of an infrared or microwave receiver. Here, the backscattered intensity of the electromagnetic radiation is analyzed for two different wavelengths or narrow wavelength bands, and the quotient of these two intensities or the detector signal voltages derived therefrom is formed. According to the value of the determined quotient, a conclusion is drawn with respect to whether the road is dry, wet or icy.

One object of the present invention is to provide a process and apparatus for determining the condition of a road surface (particularly with respect to the presence of water, ice and/or snow), with relatively low expenditures in a very reliable and precise manner, as well as independently of the road covering.

This and other objects and advantages are achieved by the process and apparatus according to the invention, in which light beamed onto the road surface contains at least a first light fraction from a first wavelength range which is not significantly absorbed by water or ice including snow, and a second light fraction from a second wavelength range which is significantly absorbed by these materials. Here, the first light fraction contains light of several different wavelengths.

The light backscattered by the road surface is detected and spectrally analyzed. For this purpose, an approximation reference curve is determined based on the spectral data obtained for a first backscatter light fraction which pertains to the several different wavelengths of the first light fraction. This can occur, for example, by determining the approximation reference curve as a parameterized compensating curve over the individual measuring points of these spectral data by using a customary compensating calculation. The approximation reference curve extends along the entire spectral plot of the backscattered light, thus also along the wavelength range of the second light fraction that is characterized by a significant absorption by water/ice. As a result, starting from the measuring points in the wavelength range of the first light fraction (without significant water/ice absorption), the approximation reference curve is interpolated or extrapolated into this wavelength range of the second light fraction.

In this manner, the approximation reference curve forms a reference curve in the wavelength range of the second light fraction. This reference curve reflects, at least approximately, the spectral distribution of the backscattered light in this wavelength range (in the case of a dry road surface). In the case of a wet or icy road, the spectral data of the backscattered light in the second wavelength range deviates noticeably from the approximation reference curve, because of a corresponding absorption of the second light fraction by the water or ice.

This process of the present invention from that disclosed in International Patent Document WO96/26430 A1 in that the second light fraction contains light of several different wavelengths, and the difference between the spectral data of the backscattered light fraction originating from the second light fraction and the corresponding data of the approximation reference curve is determined not only at one or several points, but at as many points as possible as a difference curve. The condition of the road surface can then be determined from the plot of the difference curve, qualitatively and quantitatively in a comparatively precise manner.

In accordance with the present invention, the approximation reference curve can be determined using only the backscattering light ratio which pertains to the wavelength range without significant absorption by water or ice. Alternatively, backscattered light fractions which pertain to the wavelength range with significant absorption by water/ice may be used in addition. In the latter case, information concerning both the plot of the curve (in the case of a dry road) and the absorption-caused downward shift of the spectral plot of the backscattered light may be mixed together in the receiver signals and be separated from one another by a suitable analysis. As a result, the approximation reference curve can be determined, and the desired difference can be determined as the difference between the approximation reference curve and the spectral plot which corresponds to the momentarily scanned road condition.

In general, the process according to the invention uses several detectors with different spectral sensitivities, and/or several light sources with different spectral emissions, each of which makes a separate contribution to the backscattered light. The backscattered light, on the other hand, is determined as the integral of the wavelength via the product of the spectral sensitivity of the respective detector with the respective spectral light intensity. Under a justified assumption that the contributions are mutually independent, each contribution supplies an equation for an equation system. Those parameters of a parameterization of the approximation reference curve as well as the desired difference or the thickness of a water layer are entered as the parameters to be determined. Therefore, when a number n of parameters are defined for the approximation reference curve, a number n+1 of different detectors and/or light sources is required in order to be able to clearly solve the equation system. The corresponding analysis is simplified, for example, if $\Delta$-functions are used for the spectral sensitivity or the spectral light intensity (that is, if the spectral course is analyzed in a punctiform manner for example, point-by-point, interpolation, at different discrete wavelengths).

In an embodiment of the present invention, the first and the second light fractions (which are relevant to the analysis of the backscattered light), are situated in the wavelength range of between approximately 800 nm and approximately 1,100 nm. This has, inter alia, the advantage that reasonably priced silicon photodetectors can be used as backscattered light detectors and no special infrared detectors are required. Another advantage is that, in the selected wavelength range, the penetration depth of the light is sufficiently large to permit a complete penetration of the water layers or ice layers which are typically present on traffic routes. Another advantage is that the wavelength range without significant water/ice absorption is composed of two partial ranges, below and above the second wavelength range. As a result, measuring points for determining the approximation reference curve are present on both sides of the second wavelength range. Subsequently, for the spectral plot of the backscattered light (in the case of a dry road), the spectral plot for the wavelength range with significant water/ice absorption can be precisely interpolated.

In still another embodiment of the present invention, the wavelength range without significant water/ice absorption consists of two partial ranges below and above the second wavelength range. This provides the advantages previously described.

In still another embodiment of the present invention, the integral of the difference curve is determined via the second wave range. The resulting (preferably) standardized integral forms a very precise measurement of the thickness of a water film which may have formed on the road surface.

In yet a further embodiment of the present invention, the center of gravity of the difference curve is determined. It was found that, as the result of this knowledge of the center of gravity's position, a decision can be made as to whether a covering situated on the road surface is a water layer or an ice/snow layer.

In still a further embodiment of the present invention, a conclusion can be drawn from the displacement concerning the temperature of the water layer or ice layer. This is because with a falling temperature of the water layer or ice layer, the position of the center of gravity of the difference curve is displaced toward larger wavelengths. The knowledge of the temperature of the water layer or ice layer, in addition to the knowledge of the layer thickness, supplies valuable information in order to be able to judge whether dangerous slippery ice is present.

In an even further embodiment of the present invention, the driver can be given an early warning which provides an ample amount of time in which to prepare for freezing rain. The possibility of also determining (during the analysis process), the water temperature or ice temperature, offers the advantage that (via the temperature), an advanced warning can be derived if water is present on the road and the temperature is approaching the freezing point.

In still another embodiment of the present invention, an additional discrimination between ice and snow is possible because in the case of snow the difference curve, which is similar to that for ice, has a lower amplitude.

Other objects, advantages and novel features of the present invention will become apparent from the following detailed description of the invention when considered in conjunction with the accompanying drawings.

DETAILED DESCRIPTION OF THE EMBODIMENT

Figure 1:
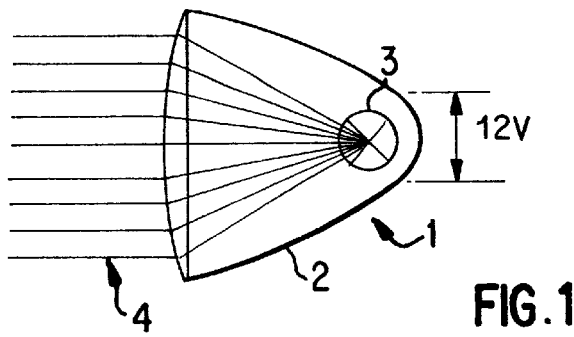
FIG. 1 is a schematic block diagram of a system for implementing the process according to the invention for determining the condition of a road surface.
Figure 1B:
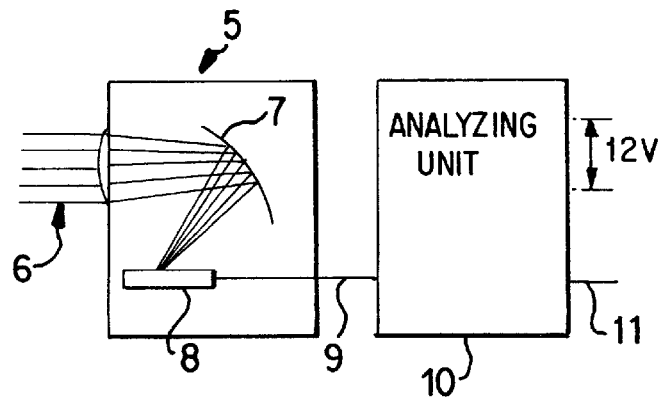

FIG. 1 illustrates a system suitable for implementing the process according to the invention. This system comprises a light generating unit 1 having a light source 3 which is arranged in proximity to the focal point of a reflector 2 and which is fed by a 12 V supply voltage (for example, an on-board supply system of a motor vehicle). The light source 3 emits light in a broad-band wavelength range (in particular between approximately 800 nm and approximately 1,150 nm). The emitted light leaves the reflector 2 as a cluster 4 of essentially parallel light beams which is beamed onto a road surface (not shown). Via a lens system and/or a fiber-optical light guide, a receiver 5 receives the light 6 backscattered to it from the road surface. From the lens system and/or fiber-optical light guide, the backscattered light impinges on a dispersive element 7 of the receiver 5. Spectrally divided in this manner, the backscattered light is reflected on a silicon photodetector in the form of a CCD sensor line 8. The dispersive element 7 may be formed, for example, by a diffraction grid, an interference filter or a prism. The output signal 9 of the CCD line 8 is fed to an analyzing unit 10 (for example, a CPU, a microprocessor, or the like) which is also fed by the 12 V supply voltage and is connected to a data bus 11, such as a CAN bus.

The analyzing unit 10 is designed in a suitable manner in order to analyze the output signal 9 of the CCD line 8. Specifically the process takes placed as follows. Each pixel (that is, each scanning unit cell of the CCD line 8) receives backscattered light of a respective pertaining wavelength or of a pertaining narrow spectral line from the dispersive element 7. The contribution of each pixel of this type to the output signal 9 therefore corresponds to the backscattered light intensity of the respective wavelength. In this manner, the analyzing unit 10 is able to determine the corresponding backscatter intensity for the various measuring wavelengths from the signals of the respective pixels of the CCD line 8.

Figure 2:
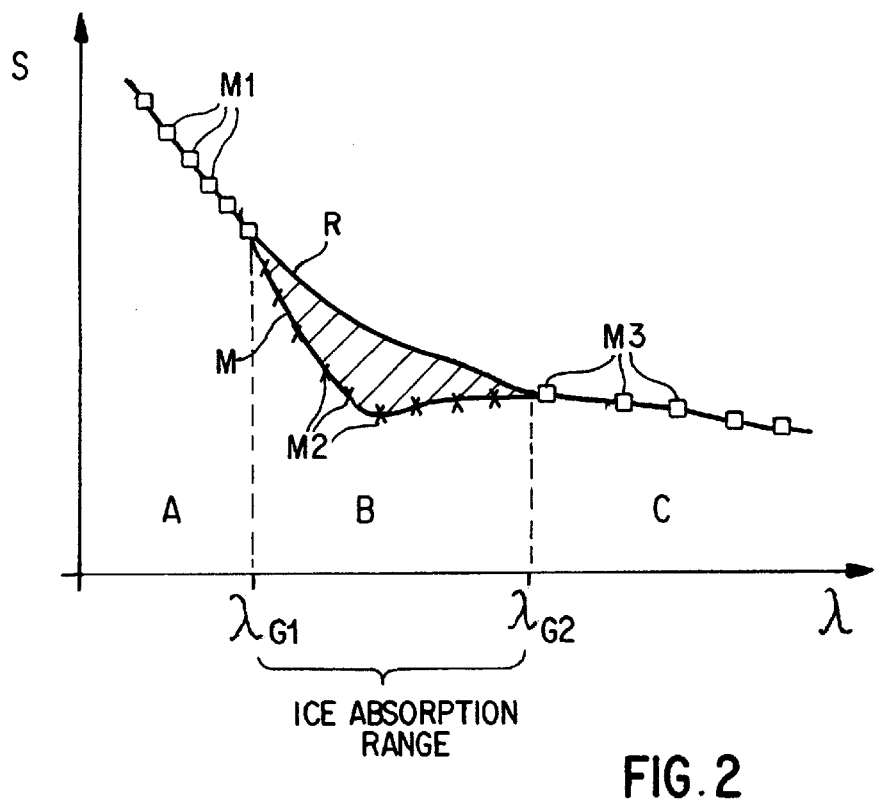
FIG. 2 is a diagram with idealized backscattered-light spectral data obtained by the system of FIG. 1.

FIG. 2 illustrates an ideal plot of analysis process in diagram form. As shown in FIG. 2, the analyzing unit 10 first determines the spectral data of the backscattered light by measuring values of the relative spectral backscattered-light intensity S corresponding to the output signal contribution of each of the respective CCD line pixels, as a function of the wavelength $\lambda$ for a plurality of measuring points corresponding to the number of CCD line pixels. The system is designed such that, in each case, a plurality of measuring points M1, M2, M3 are situated in one of three successive wavelength intervals A, B, C.

In this plot, a first wavelength interval A extends to a lower of two limit values, $\lambda_{G1}$. A second wavelength interval B follows interval A, and extends to the greater to the two limit values, $\lambda_{G2}$. Moving to the right on the $\lambda$ axes, interval B is followed by the third wavelength interval C. The two limit values $\lambda_{G1}$, $\lambda_{G2}$ are selected such that the intermediate wavelength interval B represents a wavelength range with significant light absorption by water or ice or snow. Concurrently, the two outer wavelength intervals A, C form two partial ranges of a wavelength range in which the light is not noticeably absorbed by water, ice or snow. Such a situation occurs, for example, by a selection of the lower limit value $\lambda_{G1}$ at approximately 900 nm and by a selection of the upper limit value $\lambda_{G2}$ at approximately 1,050 nm. That is, it is known that an absorption line of water/ice is situated in the region between these values (region B), while no significant absorption by water/ice occurs in the range above 1,050 nm (region A) or the range below 900 nm (region C).

The analyzing unit 10 now uses the measuring points M1 and M3 in the two partial ranges of the first wavelength range (the one without significant absorption by water/ice). The points M1 and M3 are used to determine an approximation reference curve R for the spectral plot of the backscattered light in the case of a dry road, in the form of an approximation curve via a customary approximation process. To accomplish this, a mathematical function (for example, a polynomial, with a definable number of free parameters) is defined and the parameters are fixed via the approximation process. When the function contains a number n of parameters and the water level is defined as an additional unknown quantity to be determined, a number n+1 of measuring channels, i.e., measuring points M1, M3 in the first wavelength range are required. In the simplest case of the use of a straight line as the approximation reference curve, at least three measuring points M1, M3 are therefore required. Preferably, a total of significantly more measuring points are used, for example, between 20 and 30 measuring points M1, M2, M3 distributed uniformly over the whole observed wavelength range, i.e., over the three wavelength intervals A, B, C. When more measuring points M1, M3 exist in the two partial ranges A, C of the first wavelength range than free parameters of the defined function, the equation system for determining the parameters is overdetermined. Here, via a compensating calculation, a solution can be found which is best adapted to the measuring points M1, M3 (for example, at least squares fit). In this manner, the determination of the approximation reference curve as a compensation curve reduces the influence of signal noise and increases the precision.

Starting the approximation reference curve R from the point fixed by the measuring points M1, M3 in the two partial areas A, C of the first wavelength range, the approximation reference curve R also extends in the intermediate second wavelength range B. In this situation, the approximation reference curve R therefore represents an interpolation curve. Since the approximation reference curve R was determined via the measuring points M1, M3 which are located in the wavelength range that is without significant water/ice absorption, in the wavelength range B with significant water/ice absorption the approximation reference curve R represents the case of a dry road surface. It is therefore suitable for use as a reference for determining respective (possibly existing) deviations of the spectral data measured in this wavelength range B.

FIG. 2 further illustrates the case of a wet road for which the spectral backscatter intensities in the second wavelength range B (i.e., the measuring values of the measuring points M2 situated there) are noticeably below the approximation reference curve, due to the partial absorption of the light from this wavelength range B by the water of the road surface.

The distance of the measuring values pertaining to the measuring points M2 of the second wavelength range B from the approximation reference curve R is therefore a clear qualitative and quantitative measurement of the presence of water on the irradiated road surface. In this case, it is very important that the difference between the approximation reference curve and the measured spectral backscatter intensities in the wavelength range with significant water/ice absorption is independent of the respectively existing road covering; that is, that it remains unaffected by a spectral reflection capacity of the road which may not be constant for all wavelengths. Thus, at relatively low expenditures, the process clearly furnishes better results than previous approaches which are based on the assumption that the road covering acts as a gray radiator. The present process according to the invention, also provides advantage in that it can still be used when the actual absorption behavior deviates from an exact simple exponential law.

Instead of only a punctiform analysis of this difference between the measured spectral data and the data of the approximation reference curve R in the second wave range B, preferably an even more precise analysis of the data is provided in a continuous form by the analyzing unit 10 which will be explained in connection with FIG. 2. Here, the analyzing unit 10 connects the measured values at the individual measuring points M1, M2, M3 of all observed wavelength intervals A, B, C as supporting points of a continuous measuring curve M with one another, and calculates the difference curve between the approximation reference curve R and the measuring curve M.

Figure 3:
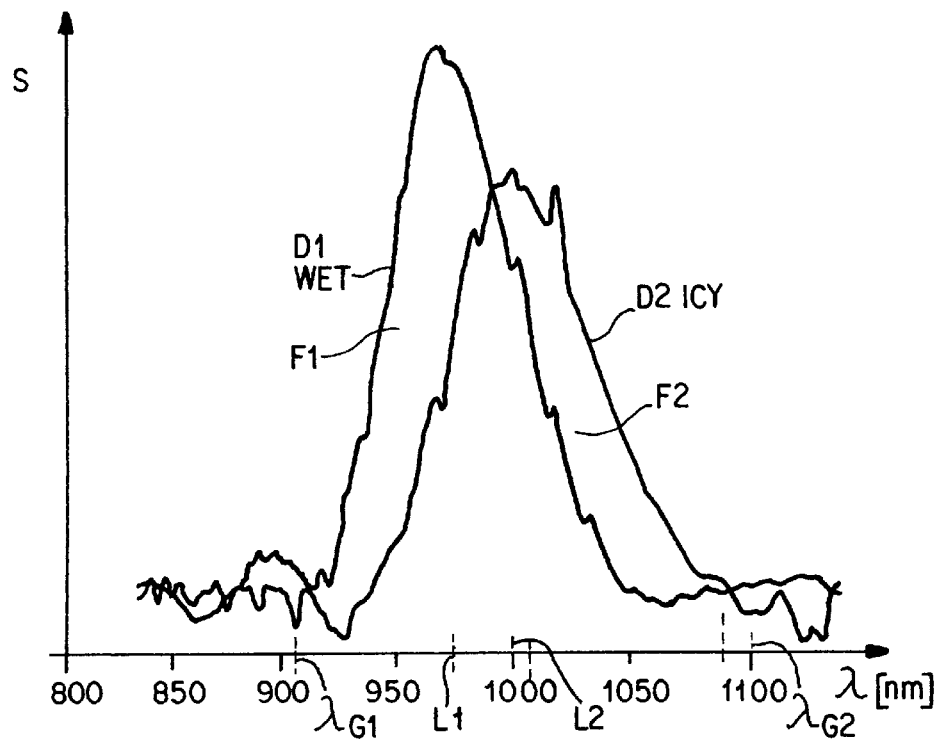
FIG. 3 is a diagram with two spectral-data difference curves obtained by the system of FIG. 1.

FIG. 3, on the one hand, shows a difference curve D1 calculated in this manner which was obtained for the case of a wet road surface, together with another difference curve D2 obtained for the case of an icy road surface. The analyzing unit 10 analyzes the respective difference curve D1, D2. That is, the analyzing unit 10 determines the areas F1, F2 beneath the respective difference curves D1, D2, i.e., the integrals of the curves D1, D2 using the wavelength $\lambda$ in the wavelength range with significant water/ice absorption (i.e., between the two selected limit values $\lambda_{G1}$, $\lambda_{G2}$), as well as the position of the center of gravity L1, L2 of the respective difference curve D1, D2.

It was discovered that in the presence of ice or snow, the position of the center of gravity of the obtained difference curve is displaced with respect to the presence of water on the road surface. Therefore, in the example of FIG. 3, the center of gravity L2 of the difference curve D2 which results from an ice covering is situated at a higher wavelength than the center of gravity L1 of the difference curve D1 which results from a water covering. More specifically, tests have revealed that the position of the center of gravity of the difference curve resulting from the absorption by water with a falling water temperature is displaced from smaller to larger wavelengths. On the other hand, the position of the center of gravity of the difference curve resulting from an ice covering at 0° C., is clearly displaced with respect to the position of the center of gravity of a difference curve resulting from a water covering at 0° C. toward larger wavelengths. Furthermore, tests have shown that, in the case of a snow covering present on the road surface, the position of the resulting difference curve is then similar to that for the ice covering, (i.e., D2), but has lower amplitude values. Thus, the process also permits the recognition of snow cover on the road surface and (in this case, particularly) the differentiation between a water covering or an ice covering.

According to the present invention, a wavelength threshold value was fixed approximately in the center between the positions of the center of gravity of these two difference curves at 0° C. Then, during a measuring operation for determining the condition of a road surface, the pertaining difference curve was calculated by the analyzing unit 10, to first determine whether this difference curve even has a noticeable amplitude in the relevant wavelength range with significant water/ice absorption. If not, a correct conclusion is easily drawn as to whether a the road surface is dry. When a difference curve is present which has a noticeable amplitude, such as the curves D1 and D3 of FIG. 3, their center of gravity position is determined, as well as whether this position is below or above the defined wavelength threshold value. In the former case, a conclusion can be drawn that the road surface is covered by water. In the latter case, the absorption is caused by ice or snow covering the road surface. From the precise position of the center of gravity of the difference curve (in the case of a water or ice covering), a conclusion can also be drawn concerning the temperature of the water or ice. This is possible because with a falling temperature of the water layer or ice layer, the position of the center of gravity of the difference curve is displaced toward larger wavelengths. Knowledge of the temperature of the water or ice layer (in addition to supplying knowledge of the layer thickness), also supplies valuable information for use in judging the dangerous slippery ice. If water is present on the road and the water temperature approaches the freezing point, the driver can be given an early warning (an acoustic or visual warning signal) which provides an ample amount of time in which to prepare for freezing rain.

If the position of the center of gravity indicates an ice/snow covering, a decision is made by analyzing the difference curve amplitude as to whether an ice covering or a snow covering is involved. The reason for this is that, in the case of snow, the difference curve has an appearance which is similar to the difference curve for ice, but with a lower amplitude.

Furthermore, quantitative information concerning the thickness of the water layer can also be obtained from the determined difference curve. This information is obtained because it was found that (mainly in the case of a water layer on the road surface), the surface F1 enclosed by the pertaining difference curve (such as the curve D1 of FIG. 3) is a clear measurement of the thickness of the water layer. By calculating the integral of the difference curve D1 in the wavelength range with significant absorption by water (i.e., by determining the surface F1 of FIG. 3), the thickness of the recognized water layer on the road surface can be determined relatively precisely.

Figure 4:
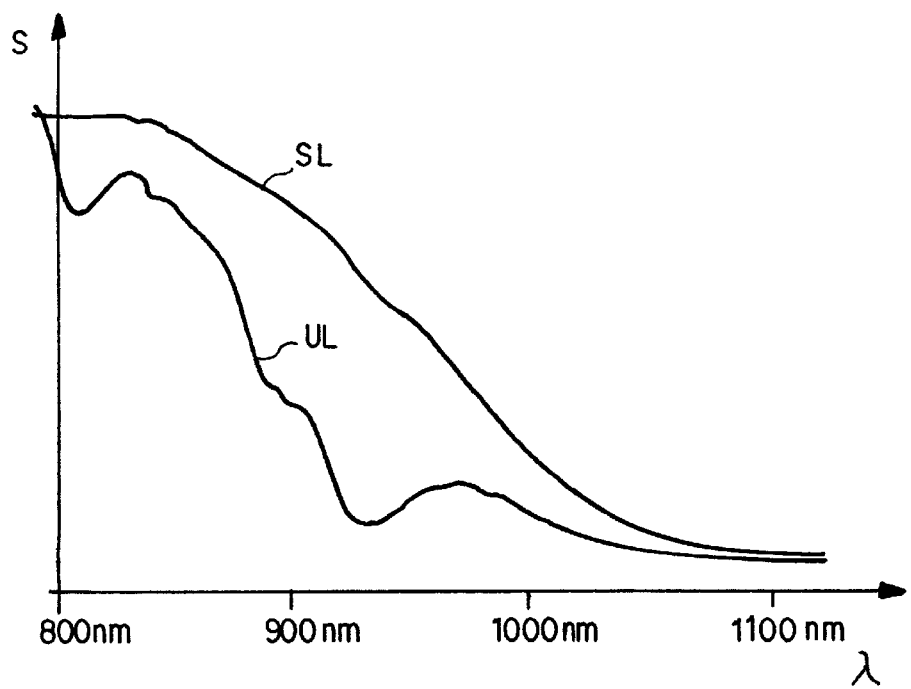
FIG. 4 is a view of the typical plot of the spectral intensity in the infrared range of ambient light (UL) and of light of a light generating unit (SL).

In an advantageous embodiment of process according to the invention, possible interference influences are compensated by ambient light. In this case, the separation between ambient light and sensor light takes place purely mathematically on the basis of the spectral differentiating characteristics. FIG. 4 illustrates the typical spectral plots in the infrared range of ambient light (UL) and the light generating unit (SL). Measurements show that the ambient light spectrum changes slightly in the course of a day. The pronounced differences of the spectrums (UL, SL) permit a reliable application of the process.

For this purpose, two reference spectrums are obtained. Specifically, spectrums of an $S_1(\lambda)$ for daylight when the light generating unit is deactivated (i.e., without sensor light), and the spectrum of $S_0(\lambda)$ when ambient light is absent and the light generating unit is activated are obtained for a certain reference road covering.

Measurements show that the course of the spectral reflection capacity for various road coverings can be closely approximated by monotonic, continuously extending curves which can be converted to one another by the multiplication with a suitable function $P(\lambda, A, B \ldots)$ having certain parameters A, B, . . . . Based on this assumption, the backscattered light spectrum measured on an arbitrary road covering is obtained from the product of the parameter-dependent function $P(\lambda, A, B, \ldots)$ and the sum of the ratios of the first and second reference spectra $S_0(\lambda)$ and $S_1(\lambda)$.

The thus obtained function for the backscattered light spectrum of a dry arbitrary road is multiplied an exponential absorption term $T(\lambda, d)=\exp(-\alpha(\lambda)d)$ which describes the light transmission of a water layer of a defined thickness d (where $\alpha(\lambda)$ is the wavelength-dependent absorption coefficient of water or ice). The absorption coefficient $\alpha(\lambda)$ has a known plot which may either be stored in a memory or in ranges approximated by analytical functions (such as Gauss curves or Lorentz curves). Since the absorption spectrum is known to shift toward higher wavelengths when temperatures approach the freezing point, it is advantageous to introduce (as a further parameter to be adapted) the temperature t into the approximation curves for $\alpha(\lambda)$ or also to file the curves for $\alpha(\lambda)$ in a temperature parameterized manner.

In order to be able to also detect the case of a water layer on ice or an ice water mixture, it is possible to introduce another parameter for the ice ratio which determines to what extent the absorption curves of water or ice are entered into the mathematical model for the absorption term $T(\lambda)$.

Altogether, a mathematical function is obtained for the wavelength-dependent plot of the backscatter intensity which has the following form:

$$S(\lambda)=(a\ S_0(\lambda)+b\ S_1(\lambda)\ P(\lambda, A, B, C \ldots)\ T(\lambda, d, t)$$

wherein a and b are the respective fractions of the sensor light and of the ambient light, so that a+b=1. For reasons of simplicity, a parameter for the ice ratio was not indicated here.

A simplified analysis is obtained if the ratio factor a/b and the parameter-dependent function P are determined in a wave range without significant water/ice absorption. In the wavelength ranges without significant water absorption, the transmission $T(\lambda, d)=1$ and the above equation for the backscatter intensity is simplified as follows:

$$S(\lambda)=a\ S_0(\lambda)+b\ S_1(\lambda)\ P(\lambda, A, B, C \ldots)$$

This equation must be met for all wavelengths from the ranges without water absorption. With a sufficient number of measuring points in the wavelength range without significant water/ice absorption, the parameters a, b, A, B, C . . . can be determined such that the sum of squares of the deviations with respect to the measured spectral curve $S(\lambda)$ is minimal over all wavelengths. Via this compensating calculation, the best-approximating, parameter-dependent function P as well as the fraction factor a/b is calculated by which the two reference spectrums contribute to the above-mentioned sum.

Since all parameters are now known, the function $P(\lambda, A, B, C \ldots)$ can be interpolated into the range in which the absorption takes place. Via this calibration of the measuring system, the backscatter intensities for measuring points in the wavelength range with a significant water/ice absorption in the case of a dry road surface condition can be indicated as interpolation or extrapolation points. This interpolated curve corresponds to the measuring curve for a dry road and thus to the above-mentioned approximation reference curve.

By using the analyzing process according to the invention, the difference curve is then formed via the measuring values in the range with absorption by water/ice. As illustrated above, from the size of the difference surface and the position of the center of gravity, the water level, the water temperature and the presence of ice can be determined.

For promoting the process of the separation between ambient light and sensor light, the signals of an ambient light sensor can also be used, as is already used in vehicles, or of a sensor which determines the color temperature of the ambient light. This is known from International Patent Document WO 97/27077. Such sensors are used in vehicles for the automatic switching-on of light in the case of darkness and bad weather. By means of an ambient light sensor, the ratio factor a/b can be continuously sensed and fed into the above-mentioned analysis.

In addition to the example of the process described in detail above and the system for implementing this process, numerous other embodiments according to the invention can be implemented. Thus, for example, a system of the type can be used which is described in the above-mentioned German Patent Document DE 41 33 359 A1, in which at least three spectral channels are provided. The individual wavelengths are again selected by interference filters located in front of the photodetectors. The wavelength-dependent scatter coefficient of the road surface is arranged with a mathematical function with free parameters and this function is multiplied by an exponential absorption term which describes the light transmission of a water layer having a defined thickness. This calculation is performed in order to obtain a mathematical function for the wavelength-dependent course of the backscatter intensity. By means of the actual measured values, the free parameters of the function can then be recalculated to provide a best possible approximation, which (in addition) results in the thickness of the water layer.

In an embodiment of a system according to the invention, instead of interference filters, photodiodes are used which have different spectral sensitivities or whose spectral sensitivity is modified by broadband filters. These photodiodes are made from, for example, Si, Ge or In, Ga, As. The light intensity which is modified by such a detector is then obtained as an integral of a product function via the wavelength. In this case, the product function is obtained as the product of the spectral sensitivity of the photodetector, an exponential absorption term and of the above-mentioned function with free parameters describing the wavelength-dependent scatter coefficient of the road surface. By using several detectors with mutually linearly independent spectral sensitivity plots as a function of the wavelength, an equation system is again obtained (from which the free parameters and the water thickness can be determined). Preferably, the number of measuring points is again larger than the number of detectors so that the equation system is overdetermined. Via a compensating calculation, the influence of the signal noise can be reduced and the precision can be increased.

In another embodiment of the system having interference filters, narrow-band light sources at different wavelengths are used for the light generating unit these light sources (for example, laser diodes) are controlled in the time-division multiplex method. A broad-band photodiode is used as the receiver and the signal analysis takes place as previously described in the system with interference filters.

Still another embodiment of thee present invention, uses photodiodes, and broad-band light sources with different spectral distributions are used for the light generating unit (for example, luminous diodes) which are controlled in the time-division multiplex method. Abroad-band photodiode is used as a receiver, and the analysis takes place as described above for the system with different photodiodes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for determining a condition of a road surface, comprising:
   beaming light onto the road surface, said light including a first light fraction having a first wavelength range which is not significantly absorbed by water/ice, and a second light fraction having a second wavelength range which is significantly absorbed by water/ice, said first light fraction including first light components with differing wavelengths;
   detecting backscattered light from the road surface;
   analyzing the backscattered light from the road surface to obtain a spectral intensity distribution curve;
   determining an approximation reference curve for spectral intensity distribution of the backscattered light when the road is dry using spectral data of the detected backscattered light;
   calculating a difference between spectral data of light backscattered from the second light fraction and corresponding data of the approximation reference curve for at least one wavelength of the second wavelength range, to obtain a difference curve; and
   determining the condition of the road surface based on the calculated difference curve; wherein
   the second light fraction contains a plurality of different wavelengths; and
   the difference between the spectral data of the second backscattered-light fraction and the corresponding approximation reference curve data is determined as a difference curve between a measured spectral curve of the backscattered light and the approximation reference curve in the second wavelength range.

2. The process according to claim 1, wherein the first and second light fractions of the light beamed onto the road are in a wavelength range between approximately 800 nm and approximately 1,150 nm.

3. The process according to claim 1, wherein the first wavelength range comprises two partial ranges, one partial range being lower than the second wavelength range and the other partial range being greater than the second wavelength range.

4. The process according to claim 2, wherein the first wavelength range comprises two partial ranges, one partial range being lower than the second wavelength range and the other partial range being greater than the second wavelength range.

5. The process according to claim 1, further comprising:
   calculating an integral of the difference curve within the second wavelength range; and
   utilizing the integral of the difference curve as a measurement of thickness of a water film formed on the road surface.

6. The process according to claim 2, further comprising:
   calculating an integral of the difference curve within the second wavelength range; and
   utilizing the integral of the difference curve as a measurement of thickness of a water film formed on the road surface.

7. The process according to claim 3, further comprising:
   calculating an integral of the difference curve within the second wavelength range; and
   utilizing the integral of the difference curve as a measurement of thickness of a water film formed on the road surface.

8. The process according claim 1, wherein:
   a center of gravity of the difference curve is calculated for the second wavelength range; and
   distinguishing between water, ice and snow on the road surface based on a position of the center of gravity.

9. The process according claim 2, wherein:
   a center of gravity of the difference curve is calculated for the second wavelength range; and
   distinguishing between water, ice and snow on the road surface based on a position of the center of gravity.

10. Process according to claim 3, wherein:
    a center of gravity of the difference curve is calculated for the second wavelength range; and
    distinguishing between water, ice and snow on the road surface based on a position of the center of gravity.

11. Process according to claim 5, wherein:
    a center of gravity of the difference curve is calculated for the second wavelength range; and
    distinguishing between water, ice and snow on the road surface based on a position of the center of gravity.

12. Process according to claim 9, further comprising:
    determining a temperature of a covering of water, ice or snow on the road surface.

13. Process according to claim 12, further comprising:
    when water is on the road, determining if the temperature of the water is close to a freezing point; and
    emitting a warning to a driver that freezing is to be expected if the water is close to the freezing point.

14. Process according to claim 8, further comprising:
    when one of ice and snow is on the road, analyzing an amplitude of the difference curve to determine whether ice or snow is on the road.

15. The process according to claim 1, wherein said step of determining an approximation reference curve comprises:
    obtaining a first reference spectrum in an absence of ambient light while a light generating unit is activated based on a defined reference road covering;
    obtaining a second reference spectrum during for daylight while the light generating unit is deactivated based on the defined reference road covering;
    arranging a backscattered-light spectrum of a dry road as a parameter-dependent wavelength-dependent function, multiplied by a sum of a fraction of a first reference spectrum and a fraction of a second reference spectrum to obtain the approximation reference curve; and calculating an optimum approximation of free parameters of a function and a ratio factor from the measured spectral curve of backscattered light in the first wavelength range.

16. The process according to claim 15, further comprising:

sensing the ratio factor in a continuous manner via an ambient sensor; and utilizing the ratio factor during determination of the road condition.

17. An apparatus for determining a condition of a road surface; comprising:

a receiver;

a dispersive element located in the receiver and disposed in a path of backscattered light for spectrally dividing the backscattered light;

a detector for receiving spectrally divided backscattered light and outputting signals indicative thereof; and an analysis unit coupled to the detector for receiving the signals indicative of the spectrally divided backscattered light;

wherein said analysis unit analyzes the backscattered light from the road surface to obtain a spectral intensity distribution curve;

determines an approximation reference curve for spectral intensity distribution of the backscattered light when the road is dry using spectral data of the detected backscattered light;

calculates a difference between spectral data of light backscattered from the second light fraction and corresponding data of the approximation reference curve for at least one wavelength of the second wavelength range, to obtain a difference curve; and determines the condition of the road surface based on the calculated difference curve;

wherein the second light fraction contains a plurality of different wavelengths; and wherein the difference between the spectral data of the second backscattered-light fraction and the corresponding approximation reference curve data is determined as a difference curve between a measured spectral curve of the backscattered light and the approximation reference curve in the second wavelength range.

18. The apparatus according to claim 17, wherein the dispersive element is one of a diffraction grid, an interference filter and a prism.

19. The apparatus according to claim 17, wherein the analyzing unit is a microprocessor.

20. The apparatus according to claim 17, wherein the detector is a silicon photodetector.

* * * * *